United States Patent
Mizusaki et al.

(10) Patent No.: US 7,679,885 B2
(45) Date of Patent: Mar. 16, 2010

(54) TANTALUM POWDER AND METHODS OF MANUFACTURING SAME

(75) Inventors: Yujiro Mizusaki, Fukushima-ken (JP); Hitoshi Iijima, Tokyo-to (JP); Yoshikazu Noguchi, Fukushima-ken (JP)

(73) Assignee: Cabot Corporation, Boston, MA (US)

( * ) Notice: Subject to any disclaimer, the term of this patent is extended or adjusted under 35 U.S.C. 154(b) by 26 days.

(21) Appl. No.: 12/261,149

(22) Filed: Oct. 30, 2008

(65) Prior Publication Data

US 2009/0067121 A1   Mar. 12, 2009

Related U.S. Application Data

(63) Continuation of application No. PCT/US2007/010677, filed on May 3, 2007.

(60) Provisional application No. 60/798,070, filed on May 5, 2006.

(51) Int. Cl.
H01G 9/042 (2006.01)

(52) U.S. Cl. .................. 361/529; 361/508; 361/509; 361/523; 361/525; 361/528

(58) Field of Classification Search ......... 361/528–529, 361/508–509, 516–519, 523–525, 530, 531; 29/25.01, 25.03; 75/363, 369
See application file for complete search history.

(56) References Cited

U.S. PATENT DOCUMENTS

| | | | |
|---|---|---|---|
| 4,149,876 A | 4/1979 | Rerat | |
| 4,508,563 A | 4/1985 | Bernard et al. | |
| 4,544,403 A | 10/1985 | Schiele et al. | |
| 4,805,074 A | 2/1989 | Harakawa et al. | |
| 4,940,490 A | 7/1990 | Fife et al. | |
| 4,957,541 A | 9/1990 | Tripp et al. | |
| 5,082,491 A * | 1/1992 | Rerat | 75/255 |
| 5,211,741 A | 5/1993 | Fife | |
| 5,217,526 A | 6/1993 | Fife | |
| 5,234,491 A * | 8/1993 | Chang | 75/622 |

(Continued)

FOREIGN PATENT DOCUMENTS

CN   1449879 A   10/2003

(Continued)

OTHER PUBLICATIONS

International Search Report and Written Opinion from International Application No. PCT/US2007/010677, dated Jan. 22, 2008, fifteen pages.

Primary Examiner—Nguyen T Ha
(74) Attorney, Agent, or Firm—Kilyk & Bowersox, P.L.L.C.

(57) ABSTRACT

Tantalum powder capable of providing a small-sized tantalum electrolytic capacitor while maintaining capacity is described. Tantalum powder in the present invention can be characterized in that the CV value is from 200,000 to 800,000 μFV/g, when measured by the following measuring method. Pellets are produced by forming tantalum powder such that the density is 4.5 g/cm$^3$, then the pellets are chemically converted in a phosphoric acid aqueous solution of concentration 0.1 vol. % at a voltage of 6V and a current of 90 mA/g, and the chemically converted pellets are used as measuring samples to measure the CV value in a sulfuric acid aqueous solution of concentration 30.5 vol. % at a temperature of 25° C. under a frequency of 120 Hz and a voltage of 1.5V.

27 Claims, 2 Drawing Sheets

U.S. PATENT DOCUMENTS

| | | |
|---|---|---|
| 5,245,514 A | 9/1993 | Fife et al. |
| 5,306,462 A | 4/1994 | Fife |
| 5,412,533 A | 5/1995 | Murayama et al. |
| 5,448,447 A | 9/1995 | Chang |
| 5,580,367 A | 12/1996 | Fife |
| 5,954,856 A * | 9/1999 | Pathare et al. .................. 75/255 |
| 6,051,044 A | 4/2000 | Fife |
| 6,115,235 A * | 9/2000 | Naito ......................... 361/303 |
| 6,193,779 B1 | 2/2001 | Reichert et al. |
| 6,322,912 B1 | 11/2001 | Fife |
| 6,338,816 B1 | 1/2002 | Fife |
| 6,375,704 B1 | 4/2002 | Habecker et al. |
| 6,377,443 B1 * | 4/2002 | Hahn et al. .................. 361/508 |
| 6,420,043 B1 | 7/2002 | Fife et al. |
| 6,432,161 B1 * | 8/2002 | Oda et al. ..................... 75/363 |
| 6,462,934 B2 | 10/2002 | Kimmel et al. |
| 6,527,937 B2 | 3/2003 | Fife |
| 6,699,757 B1 | 3/2004 | Hwang |
| 6,716,389 B2 * | 4/2004 | Tripp et al. ................... 419/13 |
| 6,786,951 B2 | 9/2004 | He et al. |
| 6,788,523 B1 | 9/2004 | Hossick-Schott et al. |
| 6,804,109 B1 | 10/2004 | Hahn et al. |
| 6,813,140 B1 | 11/2004 | Huntington |
| 6,870,727 B2 | 3/2005 | Edson et al. |
| 7,172,985 B2 | 2/2007 | Pinceloup et al. |
| 7,190,571 B2 | 3/2007 | Heusmann et al. |
| 2003/0110890 A1 | 6/2003 | He et al. |
| 2004/0256242 A1 | 12/2004 | Melody et al. |

FOREIGN PATENT DOCUMENTS

| | | |
|---|---|---|
| JP | 8-162372 A | 6/1996 |
| JP | 2000-226607 A | 8/2000 |
| RU | 2189294 C1 | 9/2002 |
| RU | 2242329 C2 | 12/2004 |
| WO | WO 2006/062234 A1 | 6/2006 |

* cited by examiner

TANTALUM POWDER AND METHODS OF MANUFACTURING SAME

This application is a continuation of International Application No. PCT/US2007/010677, filed May 3, 2007, which, in turn, claims priority to U.S. Provisional Patent Application Ser. No. 60/798,070, filed May 5, 2006, which is incorporated in its entirety by reference herein.

BACKGROUND

The present invention relates to tantalum powder that can be used for a tantalum electrolytic capacitor and methods of manufacturing the same.

The present invention also relates to valve metal powders and electrolytic capacitors using the valve metal powders as well as methods of making the powders and the capacitors. More particularly, the present invention relates to high surface area valve metal powders and capacitors having high capacitance.

Tantalum capacitors, made from tantalum powder, have been a major contributor to the miniaturization of electronic circuits and have made possible the application of such circuits in extreme environments. Tantalum capacitors typically are manufactured by compressing tantalum powder to form a pellet, sintering the pellet in a furnace to form a porous tantalum body (electrode), and then subjecting the porous body to anodization in a suitable electrolyte to form a continuous dielectric oxide film on the sintered body.

Development of powders suitable for making tantalum capacitors has resulted from efforts by both capacitor producers and tantalum processors to delineate the characteristics required for tantalum powder for it to best serve in the production of quality capacitors. Such characteristics include specific surface area, purity, shrinkage, pressability, and the like.

First, the powder should provide an adequate electrode surface area when formed into a porous body and sintered. The μFV/g of tantalum capacitors can be related to the specific surface area of the sintered porous body produced by sintering a tantalum powder pellet. The specific surface area of tantalum powder can be related to the maximum μFV/g attainable in the sintered porous body.

Purity of the powder can also be an important consideration. Metallic and non-metallic contamination tends to degrade the dielectric oxide film in tantalum capacitors. While high sintering temperatures serve to remove some volatile contaminants, high temperatures also tend to shrink the porous body reducing its net specific surface area and thus the capacitance of the resulting capacitor. Minimizing the loss of specific surface area under sintering conditions, i.e., shrinkage, is necessary in order to produce high μFV/g tantalum capacitors.

As discussed above, the μFV/g of a tantalum pellet can be a function of the specific surface area of the sintered powder. Greater net surface area can be achieved, of course, by increasing the quantity (grams) of powder per pellet; but, cost and size considerations have dictated that development be focused on means to increase the specific surface area of tantalum powder.

One proposed method for increasing the specific surface area of tantalum powder is flattening the powder particles into a flake shape. However, efforts to increase specific surface area by making thinner tantalum flakes have been hindered by concomitant loss of processing characteristics, for example, very thin tantalum flake would be expected to have poor pressability and low forming voltages, for example. Also, in processes to making high surface area powders, the milling can take many hours which can be time consuming, expensive, and the long milling times typically result in reaching a point where the powder fractures. Thus, there has been somewhat of a threshold which has prevented high capacitance powders.

A tantalum electrolytic capacitor generally has an anode formed from a tantalum powder compact, an oxide film that is a dielectric substance provided by chemically converting an anode surface, and a cathode provided opposite the oxide film. In recent years, following the downsizing of electronic devices, a small-sized tantalum electrolytic capacitor with low service voltage and high capacity has been in demand. The performance of a tantalum electrolytic capacitor can be influenced by the properties of tantalum powder; for example, the larger the surface area of the tantalum powder, the larger the electrostatic capacity of the capacitor becomes. Therefore, attempts have been made to increase the electrostatic capacity by making the grain size of tantalum powder smaller and enlarging the surface area of the oxide film after chemical conversion, for example, as mentioned in Japanese Unexamined Patent Application Publication No. 8-162372, incorporated in its entirety by reference herein.

SUMMARY OF THE INVENTION

However, as in JP 08-162372, when forming an oxide film of the same film thickness as conventional oxide films by chemical conversion while making the grain size of the tantalum powder smaller, most of the tantalum powder ends up being oxidized, resulting in not enough non-oxidized area capable of becoming an anode electrode, and making it difficult to be used as a capacitor. Furthermore, by making the oxide film thin, it becomes possible to increase the electrostatic capacity; however, when the oxide film is made thin using the tantalum powder described in JP 08-162372, leakage current tends to be increased. Therefore, with the tantalum powder described in JP 08-162372 there was a limit in downsizing while maintaining the capacity of the tantalum electrolytic capacitor. The present invention has been accomplished considering these situations and with the object of providing tantalum powder capable of providing a small-sized tantalum electrolytic capacitor while maintaining capacity, as well as providing a manufacturing method to make such tantalum powder.

Generally, secondary particles comprising tantalum powder have projections and depressions with narrowed connection areas between primary particles, wherein these narrow areas (depressed areas) lead to a lack of non-oxidized area for use as an electrode after chemical conversion. Further, it has been discovered that thinning the oxide film increases leakage current, since the thickness of the film tends to become particularly thin at the depressed areas. Based on the acknowledgement thereof, the following tantalum powder and the manufacturing methods of the same have been invented, taking into consideration a decreasing of these depressed areas.

The present invention relates to tantalum powder, wherein the CV value (μFV/g) is from 200,000 to 800,000 CV/g, or from 450,000 to 800,000 CV/g when measured by the following measuring method:

Tantalum pellets are formed (with tantalum lead wires included) by pressing tantalum powder with a press density of 4.5 g/cm$^3$, then the pellets are sintered and chemically converted in a phosphoric acid aqueous solution of concentration 0.1 vol. % at a voltage of 6 V and a current of 90 mA/g, and the chemically converted pellets are used as measuring samples to measure the CV value in a sulfuric acid aqueous solution of concentration 30.5 vol. % at a temperature of 25° C. under a frequency of 120 Hz and a voltage of 1.5V.

The present invention further relates to a method of making the tantalum powder of the present invention. The method includes forming fine tantalum particles by dispersedly adding at least one reducing agent and/or nitrogen into potassium tantalum fluoride dissolved in molten salt, and smoothing (e.g., reducing surface roughness and/or increasing the thickness of the neck(s) between particles) the surface of the fine tantalum particles by subjecting them to an electrolytic and electrodeposition treatment.

The present invention also relates to a method of making the tantalum powder of the present invention, which includes forming fine tantalum particles by bringing a gaseous reducing agent into contact with a gaseous tantalum compound, and smoothing the surface of the fine tantalum particles by subjecting them to an electrolytic and electrodeposition treatment.

The methods of the present invention can further include crushing and sieving the fine tantalum powder after having been thermally aggregated (or agglomerated).

The tantalum powder of the present invention is capable of providing a small-sized tantalum electrolytic capacitor while maintaining capacity. The methods of making the tantalum powder of the present invention can obtain a small-sized tantalum electrolytic capacitor while maintaining capacity.

BRIEF DESCRIPTION OF THE DRAWINGS

The accompanying drawings, which are incorporated in and constitute a part of this application, illustrate some of the embodiments of the present invention and together with the description, serve to explain the principles of the present invention.

Figure 1:
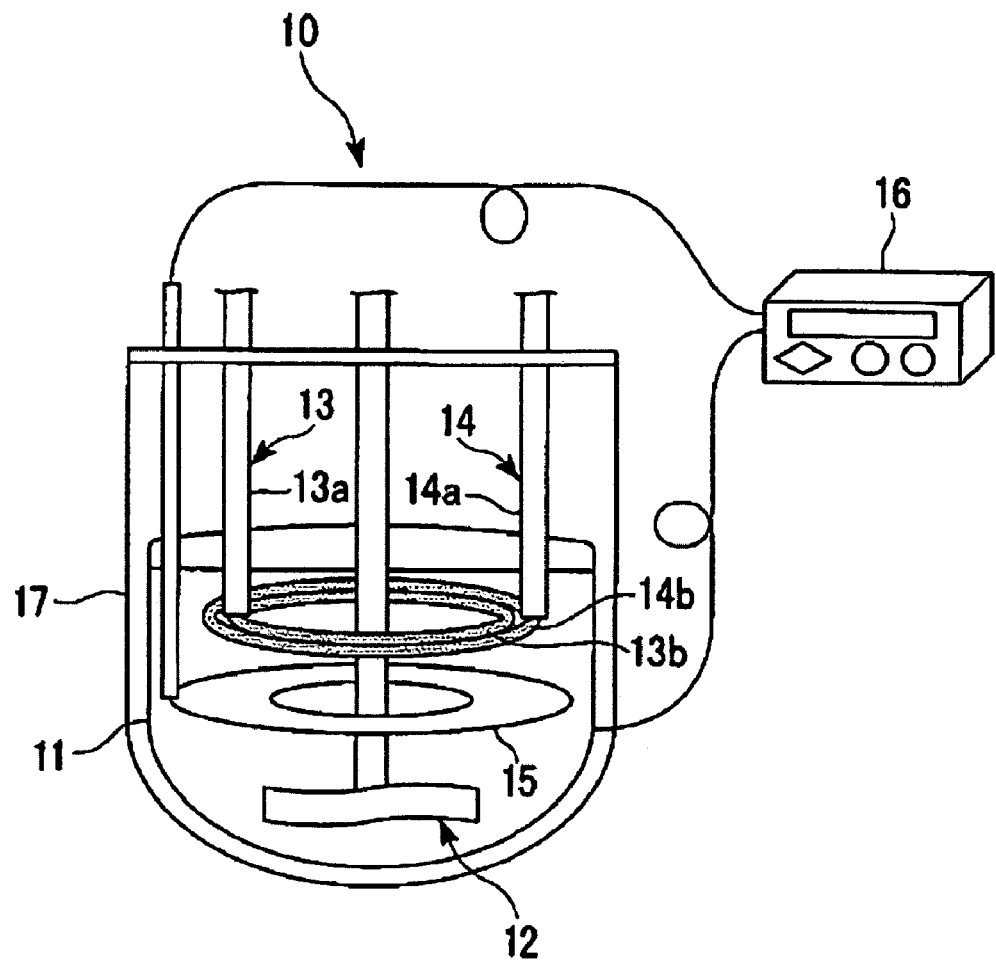
FIG. 1 is a schematic drawing illustrating a manufacturing device of tantalum powder used in one embodiment of the manufacturing methods of tantalum powder in the present invention.

| Explanations of the Symbols: | |
| --- | --- |
| 10 | Manufacturing device |
| 11 | Container |
| 12 | Stirring means |
| 13 | First adding means |
| 13a | First supply pipe |
| 13b | First sparger |
| 14 | Second adding means |
| 14a | Second supply pipe |
| 14b | Second sparger |
| 15 | Electrode |
| 16 | DC alternating power supply |
| 17 | Supporting container |
| 20a, 20b | Secondary particles |
| 21 | Primary particles |
| 22 | Neck |

DETAILED DESCRIPTION OF INVENTION

The capacitance (CV) value of the tantalum powder of the present invention can be from 200,000 CV/g to 800,000 CV/g, such as from 450,000 to 800,000 CV/g. Tantalum powder with a CV value of 450,000 µFV/g or greater permits the manufacturing of a small size but large capacity tantalum electrolytic capacitor. With respect to capacitance, the tantalum powders, when formed into an anode, can have a capacitance of from 200,000 to 800,000 CV/g, from about 500,000 to 800,000 CV/g, from about 550,000 to 800,000 CV/g, from about 600,000 to about 800,000 CV/g, from about 650,000 to about 800,000 CV/g, from about 700,000 to about 800,000 CV/g, from about 500,000 to about 750,000 CV/g, or from about 500,000 to 700,000 CV/g, and the like. However, tantalum powder with CV values exceeding 800,000 CV/g is difficult to manufacture. With respect to leakage, the leakage can be 50 nA/CV or less, such as 30 nA/CV or less, such as 25 nA/CV or less, 20 nA/CV or less, 10 nA/CV or less, such as from 1.0 nA/CV to 30 nA/CV.

Regarding the measuring method of CV values in the present invention, first, tantalum pellets are produced. The pellets have tantalum lead wires present. The tantalum powder is formed into pellets using a press density of 4.5 g/cm$^3$. In order to obtain this density, only the mass and pellet shape of the tantalum powder need to be defined. It is preferable to select the sintering temperature of the pellets arbitrarily such that the shrinkage ratio of the tantalum powder remains in a range of 5 to 10%. The sintering temperature is preferably in a range of from 900 to 1,000° C. Furthermore, the greater the CV value of the tantalum powder, the more preferable it is to select a lower temperature. Next, chemically converted substances are produced by chemically converting the pellets in a phosphoric acid aqueous solution of concentration 0.1 vol. % at a voltage of 6V. For the chemical conversion, in order to form a uniform (or substantially uniform) oxide film on the surface of tantalum powder, it is preferable to make an adjustment within a range when necessary: 30 to 60° C. for temperature, 4 to 6V for voltage, and 90 to 120 minutes for the treatment time. Then, the CV values of the chemically converted substances are measured in a sulfuric acid aqueous solution of concentration 30.5 vol. % under the conditions: temperature 25° C., frequency 120 Hz, and voltage 1.5V. With respect to sintering, the sintering time can be from 5 minutes to 1 hour or more, such as from 10 minutes to 30 minutes, 10 minutes to 20 minutes, or 10 minutes to 15 minutes. Any desirable sintering time can be used. With respect to sintering temperature, any desirable sintering temperature can be used. For instance, the sintering temperatures can be from 800° C. to 1,500° C., from 900° C. to 1,450° C., from 900° to 1,400° C., from 900° C. to 1,350° C., from 900° C. to 1,300° C., from 900° C. to 1,250° C., from 900° C. to 1,200° C., from 900° C. to 1,150° C., and any sintering temperatures within these ranges. With respect to press density, other press densities can be used either in the test method or in use of the tantalum powders in general. The press densities can be from about 3.0 to about 6.0 g/cm$^3$, such as 5.0 g/cm$^3$, or 5.5 g/cm$^3$, or 4.0 g/cm$^3$. With respect to the present invention, it is to be understood that the test method used to determine capacitance is simply a test for determining capacitance. The tantalum powders of the present invention can be used under a variety of electrical conditions, various formation voltages, various working voltages, various formation temperatures, and the like. With respect to formation voltage, other formation voltages can be used, such as 5 volts, 4 volts, 3 volts, and the like, for instance, 5 to 10 volts, 5 to 16 volts, or 5 to 20 volts, can be used as a formation voltage.

The tantalum powder of the present invention can be in the form of secondary particles formed by aggregating (or agglomerating) primary particles, or in the form of tertiary particles formed by further aggregating (or agglomerating) secondary particles.

It is preferable for the average grain size (or average particle size) of the primary particles of the tantalum powder to be 10 to 30 nm, more preferably 13 to 27 nm. Other ranges include 15 nm to 25 nm, 17 nm to 22 nm, or 18 nm to 20 nm. If the primary particles of the tantalum powder are 10 nm or larger, enough anode may be maintained after chemical conversion, and if 30 nm or smaller, the surface area of the tantalum powder may be increased. The grain sizes or particle size can refer to a lot, batch, or an amount of powder present in one anode or several anodes.

Furthermore, regarding the grain distribution (or particle size distribution) of primary particles of tantalum powder, it is preferable to have a distribution in which 80% or more of the particles fall within ±5 nm of the average grain size. For a distribution in which 80% or more of the particles fall within ±5 nm of the average grain size, as the grain distribution is even or uniform, when the primary particles are mutually aggregated, voids tend to be formed, thus permitting the materials making up the cathode to fully impregnate the inside of the tantalum powder when forming a tantalum electrolytic capacitor. The particle size distribution can be less than 80% with respect to particles falling within ±5 nm of the average grain size. The particle size distribution can be wherein 85% to 99% or more, or from 90% to 99% or more, or from 95% to 99% or more of the tantalum powder can be within ±5 nm of the average grain size. For purposes of the present invention, the various percent ranges provided for the particle size distribution can apply to particles that fall within ±10 nm or ±7 nm.

In one or more embodiments of the present invention, the tantalum powder (either primary, secondary, or tertiary powder) can have desirable flow rates. For instance, the flow rates of the tantalum powders of the present invention can have a flow rate of from about 30 seconds to about 3 minutes, wherein the test involves the time it takes for 20 grams of tantalum powder to pass through an orifice of 0.1 inch diameter. The flow rates can be from about 45 seconds to about 2½ minutes, from about 60 seconds to about 2 minutes, from about 60 seconds to about 1½ minutes, as well as other flow rates.

In one or more embodiments of the present invention, the secondary particles of the tantalum powder can have desirable particle sizes. For instance, the secondary particles of the present invention can have a D50 as determined by Microtrac of from 1 micron to 150 microns, such as from 10 microns to 125 microns, such as from 50 microns to 100 microns, such as from 75 microns to 120 microns, and the like. Further, in one or more embodiments of these D50 ranges, the D10 can range from 0.7 microns to 20 microns, such as from 1 micron to 15 microns, from 5 microns to 10 microns, and the like. Also, in one or more embodiments of the present invention, for the various D50 ranges described herein, the particles can have a D90 range of from 5 microns to 200 microns, such as from 10 microns to 175 microns, such as from 15 microns to 150 microns, from about 20 microns to about 125 microns, from about 25 microns to about 100 microns, or from about 50 microns to about 75 microns, and the like. The lower D10 numbers and lower D90 numbers typically will be more applicable to the lower D50 sizes mentioned herein, such as sizes from 1 micron to 75 microns. Furthermore, the higher end D10 and higher end D90 numbers will be more applicable to the upper ranges of the D50 range, such as from 75 microns to 150 microns.

Next, one embodiment of the manufacturing method of the tantalum powder is described. In one embodiment, a manufacturing device for tantalum powder 10 (from hereon abbreviated as manufacturing device 10), shown in FIG. 1, is used. The manufacturing device 10 is equipped with a tantalum-made container 11, a stirring means 12 inserted into the container 11, a first adding means 13 for dispersedly adding a reducing agent into the container 11, a second adding means 14 for dispersedly adding nitrogen (optionally) into the container 11, an electrode 15 installed in the container 11, a DC alternating power supply 16 electrically connected to the container 11 and the electrode 15, and an Inconel-made supporting container 17 to support the container 11. The first adding means 13 is comprised of a first supply pipe 13a and a first sparger 13b connected to the first supply pipe 13a and mounted horizontally, and the second adding means 14 is comprised of a second supply pipe 14a and a second sparger 14b connected to the second supply pipe 14a and mounted horizontally. The first sparger 13b and second sparger 14b can be ring shaped pipes provided with a plurality of pores on the bottom area which become larger as the distance increases from the connected places with the supply pipes 13a and 14a for even addition.

In one manufacturing method of the tantalum powder, first, in order to prevent impurities from being mixed in, the container 11 is optionally washed with water in advance and preferably is fully dried after further subjecting it to optional ultrasonic cleaning. Next, diluent salt is added into the container 11. The inside of the container 11 is heated to regulate molten salt, and while stirring the inside of the container 11 by the stirring means 12, potassium tantalum fluoride ($K_2TaF_7$) is added to be dissolved into the molten salt. Next, in at least one embodiment, while continuing to stir, by the first adding means 13, a reducing agent(s) is evenly and dispersedly added into the potassium tantalum fluoride dissolved in the molten salt, and at the same time, by the second adding means 14, nitrogen is dispersedly added. As a result, the potassium tantalum fluoride is reduced and fine tantalum particles composed of secondary particles which are aggregated (or agglomerated) primary particles are formed. Furthermore, in the present invention, by dispersedly adding is meant simultaneously adding (or substantially simultaneously) at a plurality of spots or locations.

Regarding the diluent salt making up the molten salt, potassium chloride (KCl), sodium chloride (NaCl), potassium fluoride (KF), or eutectic salts thereof are cited as examples. Individual salts or mixtures can be used. Regarding the reducing agent, alkali metals or alkaline earth metals such as sodium, magnesium, calcium etc., or hydrides thereof, that is, magnesium hydride and calcium hydride are cited as examples. Sodium is preferred. When sodium is used as a reducing agent, fluorine in potassium tantalum fluoride and sodium react to each other, generating a fluoride of sodium. The fluoride is water soluble and therefore easily removed in the latter process.

770° C. to 880° C. is a preferred internal temperature of the container 11. If the internal temperature of the container 11 is 770° C. or above, then the components in the container 11 may be dissolved with certainty, and if it is 880° C. or below, self-sintering of the generated tantalum primary powder may be prevented, thus preventing the generated particles from becoming coarse. Other temperatures can be used, such as less than 770° C. or higher than 880° C.

Next, an electrolytic and electrodeposition treatment can be applied for the fine tantalum particles in molten salt. In particular, by using a DC alternating power supply 16, DC alternating current with an alternately reversing current direction is generated, and the DC alternating current is applied on the fine tantalum particles through the container 11 and the electrode 15. DC alternating current generates inductive effects; therefore, even when the fine tantalum particles are not in direct contact with the container 11 and the electrode 15, the current may be applied on the fine tantalum particles. As a result, the fine tantalum particles act as a cathode or an anode. Furthermore, when the DC alternating current is being applied, the anode and the cathode switch alternately. While the fine tantalum particles are acting as an anode, electrons are removed from tantalum of the fine tantalum particles, and a phenomenon (electrolysis) occurs wherein the tantalum is cationized and dissolved into the molten salt. While the fine tantalum particles are acting as a cathode, a phenomenon (electrodeposition) occurs wherein tantalum cations in the molten salt are connected to the electrons in the fine tantalum particles and adhered onto the fine tantalum particles. As a result of alternately being subjected to electrolysis and electrodeposition, the fine tantalum particles may undergo electrolytic polishing to make their surface smooth.

Figure 4:
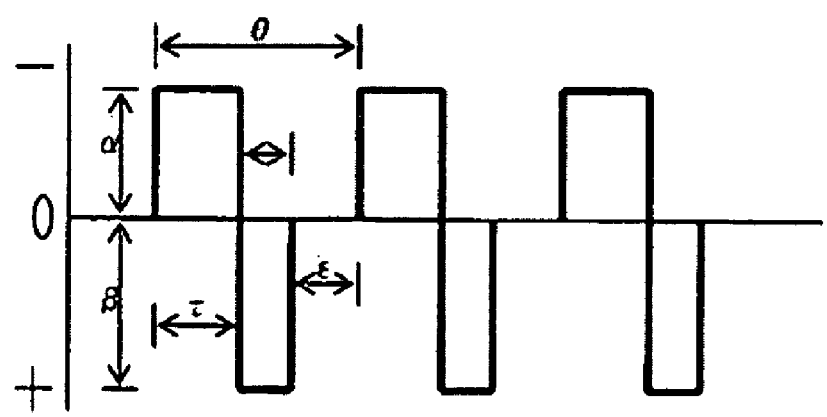
FIG. 4 is a graph showing one example of the patterns of current changes when electrolytic and electrodeposition treatment is taking place.

With regard to the electrolytic and electrodeposition treatment, to make the surface of the fine tantalum particles smooth enough, as shown in FIG. 4, it is preferred to adjust when necessary: the time of electrolysis ($\tau$), the electrodeposition current density ($\alpha$), the current density when electrolysis is taking place ($\beta$), the inversion frequency ($\theta$), and the down time ($\epsilon$). With regard to electrolysis, by adjusting the electrolysis time and the current density when necessary, mainly in the depressed areas of tantalum secondary particles with numerous projections and depressions, tantalum ions may be ionized; in particular, it is preferable that it be applied for a long duration of time under low current density. When subjected to electrolysis for a long duration of time under low current density, the tantalum ions may be kept close to the particles. Furthermore, by adjusting the down time when necessary, the diffusion of ions kept close to the tantalum surface may be promoted due to viscosity increasing effects by the ionized tantalum ions, and thus tantalum ions may be moved into the depressed areas. Moreover, with regard to the electrodeposition, by adjusting the electrodeposition time and the current density when necessary, tantalum may be absorbed and made smooth in the depressed areas; in concrete terms, it is preferable that it be applied for a short period of time under high current density. In addition, due to the vibration effects generated by current inversions or the surface tension between the area where the concentration of tantalum ions is high and the area of molten salt, smoothing the surface may be promoted. With respect to the ability of the present invention to smooth the tantalum powder surface (e.g., increase the neck thickness), when the starting agglomerated powder is compared with the tantalum powder after the electrolytic and/or electrodeposition treatment, the neck thickness can be increased 5% or more, 10% or more, 15% or more, 20% or more, 25% or more, or 30% or more, with respect to neck thickness.

Furthermore, 0.001 to 0.1 A/cm$^2$ is the preferred current density for both electrolysis and electrodeposition. Other current density ranges can be 0.01 to 0.1 A/cm$^2$, or 0.05 to 0.1 A/cm$^2$. If the current density is too low, reactions are unlikely to progress; on the other hand, if it is too high, the reaction speed exceeds 1 nm/sec., resulting in a tendency for control to become difficult. The current density can be above 0.1 A/cm$^2$ or below 0.001 A/cm$^2$.

The time for electrodeposition (time that fine tantalum particles are acting as a cathode) is preferably 0.8 to 10 times (e.g., 1 to 8 times, 2 to 7 times, 3 to 5 times) as much as the time for electrolysis (time that fine tantalum particles are acting as an anode). If the time for electrodeposition is 0.8 times as much as the time for electrolysis or longer, then the surface of the fine tantalum particles may be made smooth enough, and if it is less than 10 times as much, it is possible to prevent the particles from becoming coarse as a result of excess electrodeposition. In the event that the grain size of the primary particles of fine tantalum particles is large, the particles may be made finer; therefore, it is preferable to lengthen the time for electrolysis.

Since tantalum particles are fine, electrolysis and electrodeposition are conducted within an extremely short period of time (within 0.226 nm/sec for 0.1 A/cm$^2$). Therefore, if the inversion frequency is too low, then the inversion effect is not fully demonstrated, and if it is too high, the transferring speed of ions cannot catch up. Moreover, sometimes the shape may fill up with needless voids in a dendrite state with impurities. The inversion frequency in general can be within 0.5 nm/sec., within 0.3 nm/sec., within 0.2 nm/sec., within 0.1 nm/sec., within 1 nm/sec., for any current density.

Next, the smooth surface fine tantalum particles can be thermally aggregated (or agglomerated) to form tertiary particles (e.g., average size of from 500 to 5000 μm and/or the particle size distribution). The thermal aggregation is preferably conducted under conditions in which the shrinkage ratio occurring becomes 5 to 10%. With a shrinkage ratio of 5% or greater, thermal aggregation can be satisfactorily carried out, and a shrinkage ratio of 10% or below can prevent excess thermal aggregation. For the shrinkage ratio to be in said range, the temperature for thermal aggregation is preferably 900 to 1200° C., more preferably approximately 1050° C. If the thermal aggregation temperature is 900° C. or greater, a shrinkage ratio of 5% or greater can be achieved, and if it is 1200° C. or less, a shrinkage ratio of 10% or less can be achieved. The thermal aggregation can occur at these temperatures for a sufficient time to cause aggregation, for instance, 5 minutes or more. The shrinkage ratio can be outside of the range of 5% to 10% in one or more embodiments. For instance, the shrinkage ratio can be from 1% to 20%, from 3% to 20%, from 3% to 15%, or other percentages within these ranges.

Next, the thermally aggregated tertiary particles can be crushed and sieved. As a method for crushing, a method of using a roll granulator comprising differential rolls is cited as an example. The differential rolls herein are two rolls arranged with an intervening space in between which reversely rotate against each other and wherein each roll has a different number of rotations. Regarding the balance between the circumferential velocities of the two differential rolls, it is preferable that the circumferential velocity of one of the rolls be faster than the circumferential velocity of the other roll by 20% or greater, since this permits the obtaining of 44 to 150 μm of tantalum powder at a higher shrinkage rate. The one roller can have a different rotational speed from the other roller (e.g., different rpm), such as 20% to 100% greater, 20% to 80% greater, 25% to 75% greater, or 30% to 70% greater.

Regarding the sieving method, a method for sieving crushed powder by piling up two sieves of different meshes is cited as an example. Herein, one of the two sieves allows powder smaller than the upper limit of a given grain size range to pass through but does not allow powder larger than the upper limit of the given grain size range to pass through, while the other one allows powder smaller than the lower limit of the given grain size range to pass through but does not allow powder larger than the lower limit of the given grain size range to pass through. The former sieve is placed above with the latter one on the bottom when being used. Furthermore, regarding the sieving method, as an example, a vibration technique or a revolving technique may be applied. Herein, the vibration technique is a method of moving piled sieves upward and downward, and the revolving technique is a method of circularly moving the piled sieves horizontally.

As described, tantalum powder (average grain size of approximately 44 to 150 μm or having a grain size range of from 55 to 150 μm) composed of tertiary particles obtained from sieving can be used, for example, as tantalum powder for a tantalum electrolytic capacitor. The tertiary particles are typically agglomerated.

With respect to the purity of the tantalum powder, the tantalum powder can have any desirable purity with respect to tantalum. For instance, the tantalum metal can have a purity of 95% Ta or greater, such as 99% Ta or higher, such as 99.95% Ta or higher, such as 99.99% Ta or higher, or from 99.999% Ta or higher. Various impurity levels can be as described below.

In at least one embodiment of the present invention, the powder and/or pellet, and/or sintered anode, can have the following characteristics, but it is to be understood that the powder can have characteristics outside of these ranges:

Purity Levels:

Oxygen content of from about 5,000 ppm to about 60,000 ppm, such as from about 8,000 ppm to about 50,000 ppm or from about 10,000 ppm to about 30,000, or from about 12,000 ppm to about 20,000 ppm oxygen. An oxygen (in ppm) to BET (in $m^2/g$) ratio can be from about 2,000 to about 4,000, such as from about 2,200 to about 3,800, from about 2,400 to about 3,600, from about 2,600 to about 3,400, or from about 2,800 to about 3,200, and the like.

A carbon content of from about 1 ppm to about 100 ppm and more preferably, from about 10 ppm to about 50 ppm or from about 20 ppm to about 30 ppm carbon.

A nitrogen content of from about 100 ppm to about 20,000 ppm or higher and more preferably from about 1,000 ppm to about 5,000 ppm or from about 3,000 ppm to about 4,000 ppm or from about 3,000 ppm to about 3,500 ppm nitrogen.

A hydrogen content of from about 10 ppm to about 1,000 ppm, and more preferably from about 300 ppm to about 750 ppm, or from about 400 ppm to about 600 ppm hydrogen.

An iron content of from about 1 ppm to about 50 ppm, and more preferably from about 5 ppm to about 20 ppm iron.

A nickel content of from about 1 ppm to about 150 ppm, and more preferably from about 5 ppm to about 100 ppm or from about 25 ppm to about 75 ppm nickel.

A chromium content of from about 1 ppm to about 100 ppm and more preferably from about 5 ppm to about 50 ppm or from about 5 ppm to a bout 20 ppm chromium.

A sodium content of from about 0.1 ppm to about 50 ppm and more preferably from about 0.5 ppm to about 5 ppm sodium.

A potassium content of from about 0.1 ppm to about 100 ppm and more preferably from about 5 ppm to about 50 ppm, or from about 30 ppm to about 50 ppm potassium.

A magnesium content of from about 1 ppm to about 50 ppm and more preferably from about 5 ppm to about 25 ppm magnesium.

A phosphorus (P) content of from about 5 ppm to about 500 ppm and more preferably from about 100 ppm to about 300 ppm phosphorus.

A fluoride (F) content of from about 1 ppm to about 500 ppm and more preferably from about 25 ppm to about 300 ppm, or from about 50 ppm to about 300 ppm, or from about 100 ppm to about 300 ppm.

The powder can have a Fisher Sub-sieve size (FS) of about 2.5 μm or less, such as, from about 0.10 to about 2.0 μm, or from about 0.20 to about 0.8 μm. The powder can have a bulk density of from about 2.0 g/cc or less, or 1.80 g/cc or less, 1.5 g/cc or less, such as from about 0.80 g/cc to about 1.30 g/cc, or from about 1.0 g/cc to about 1.20 g/cc.

The powder (primary, secondary, or tertiary) can have a particle size distribution (based on overall %) as follows, based on mesh size:

+60# of from about 0.0 to about 1% and preferably from about 0.0 to about 0.5% and more preferably 0.0 or about 0.0.

60/170 of from about 45% to about 70% and preferably from about 55% to about 65%, or from about 60% to about 65%.

170/325 of from about 20% to about 50% and preferably from about 25% to about 40% or from about 30% to about 35%.

325/400 of from about 1.0% to about 10% and preferably from about 2.5% to about 7.5% such as from about 4 to about 6%.

−400 of from about 0.1 to about 2.0% and preferably from about 0.5% to about 1.5%.

The powder, when formed in to an anode with a sintering temperature of 1150° C. for 10 minutes with a formation temperature of 60° C. and a press density of 4.5 g/cc and a formation voltage of 6 V has a capacitance of from about 200,000 CV/g to about 800,000 CV/g, such as from about 450,000 CV/g to about 700,000 CV/g, or from about 500,000 CV/g to about 700,000 CV/g. Also, the leakage current can be less than 20 nA/μFV and can be from about 2.5 to about 15 nA/μFV or from about 3.0 to about 10 nA/μFV. The values or ranges for capacitance and/or leakage current are also possible with a sintering temperature of 1200° C. or 1250° C. for 10 minutes and/or a formation voltage of from 5 volts to 16 volts. Also, any individual value within the ranges for capacitance and leakage current can be used for purposes of the present invention.

The Ta powder of the present invention can also have a pore size distribution which can be unimodal or multi-modal, such as bi-modal. The Ta powder of the present invention can have a pore diameter, such that there is a center peak intensity at anywhere from about 0.1 μm for the pore diameter to about 0.2 μm such as from about 0.1 μm to about 0.18 μm. Also, the pore diameter can have a peak height of from about 0.3 to about 0.5 dV/d(logd), such as about 0.4 dV/d(logd). For purposes of the present invention these ranges can be within 20%, or within 10%, or within 5% or within 2% of the ranges described above and shown in all of the Figures.

The Ta powders of the present invention can have a BET surface area of from about 4.0 $m^2/g$ to about 20 $m^2/g$, and more preferably from about 4 to about 15 $m^2/g$ such as from about 12 to about 15 $m^2/g$.

The present invention also relates to capacitors containing or made from the powders of the present invention. For instance, the powders can form at least a part of the capacitor anode using conventional techniques. The capacitor can be a wet or solid capacitor.

Figure 2:
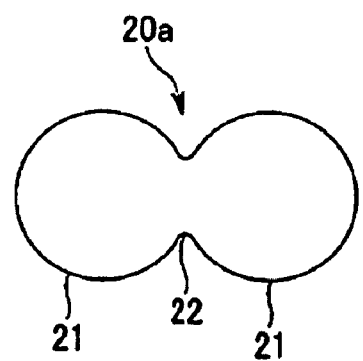
FIG. 2 is a schematic drawing illustrating secondary particles prior to electrolytic and electrodeposition treatment.
Figure 3:
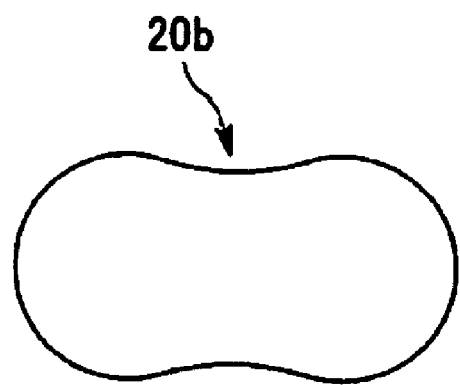
FIG. 3 is a schematic drawing illustrating secondary particles prior to electrolytic and electrodeposition treatment.

In the manufacturing method described above, by dispersedly adding one or more reducing agents, it is possible to make potassium tantalum fluoride and the reducing agent react evenly, thus forming primary particles of small grain size, and by mutual connections of the primary particles, secondary particles may be formed. In general, as shown in FIG. 2, a secondary particle 20a has a narrow mutually connected area of primary particles 21 and 21, and comes out as a structure (a structure having a neck 22) having projections and a depression; however, in the present embodiment, wherein electrolytic and electrodeposition treatment are applied, a smooth surface secondary particle 20b (ref. FIG. 3) without a neck is obtainable while being prevented from becoming coarse. This is considered to be due to the fact that during electrolysis and electrodeposition treatment, tantalum is precipitated at the depressed area (neck 22) of the secondary particle 20a but at the projected areas electrolysis is more likely to be in progress. Therefore, secondary particles obtained from electrolytic and electrodeposition treatment have a large surface area, since a small grain size is still maintained. Due to this, for tantalum powder using these secondary particles, it is possible to obtain a capacitor with large electrostatic capacity. Moreover, as a result of having a smoothed surface and narrower area, the oxide film may be formed evenly and leakage current may be reduced (in concrete terms, below 10 nA/µF). Furthermore, in the present invention there is a reduction of potassium tantalum fluoride and the same device is subjected to consecutive electrolytic and electrodeposition treatment, resulting in less impurities being mixed in. In addition, in the embodiment described above, after forming tertiary particles as a result of thermally aggregating fine tantalum particles, due to the subsequent crushing and sieving, tantalum powder with an even grain size is obtainable. If the grain size of the tantalum powder is even, spaces tend to be formed between the particles, thus increasing the surface area and allowing CV values to be easily raised.

Furthermore, in the embodiment of a manufacturing method for tantalum powder described above, as a means for dispersedly adding a reducing agent or nitrogen, a method comprising a sparger has been used; however, in the present invention, not limited to this, as an example, an adding means provided with a plurality of nozzles for adding may be used. Moreover, in the embodiment described above, although nitrogen has been added by a second adding means, the addition of nitrogen may be omitted. However, the addition of nitrogen may more easily allow the grain size of primary particles to be made smaller.

Additionally, in the embodiment described above, to form fine tantalum particles, although a reducing agent has been dispersedly added into potassium tantalum fluoride dissolved in molten salt, gaseous tantalum compounds (for example, tantalum chloride, tantalum iodide, tantalum pentaoxide, etc.) may also be brought into contact with a gaseous reducing agent to form fine tantalum particles. As a method for bringing the gaseous reducing agent into contact with a gaseous tantalum compound, a method is cited as an example, according to which, after supplying a gaseous tantalum compound and the reducing agent into a heated container, it is cooled down, and aggregated for collection. As a gaseous reducing agent, hydrogen, vaporized sodium, vaporized magnesium, etc. are cited as examples. Regarding the temperature when the reduction takes place, a temperature that is 10 to 200° C. higher than the boiling point of the tantalum compound is preferred. When the reduction takes place, if the temperature is higher than the boiling point of the tantalum compound by 10° C. or greater, the reaction may be easily controlled, while if the temperature is higher than the boiling point of the tantalum compound by 200° C. or less, particles may be prevented from becoming coarse.

Moreover, although the present invention comprises a process of thermally aggregating, crushing, and sieving smoothed fine tantalum particles, this process may be omitted. In this case, smoothed fine tantalum particles would become tantalum powder of the present invention.

With respect to nitrogen, the nitrogen can be in any state, such as a gas, liquid, or solid. Preferably, the nitrogen is in a gaseous form. The tantalum powders of the present invention, can have any amount of nitrogen present as a dopant or otherwise present. Nitrogen can be present as a crystalline form and/or solid solution form at any ratio. The nitrogen that can be present can be entirely in a crystalline form, or entirely in a solid solution form, or be combinations thereof. The amounts of nitrogen present in the tantalum powder can be any amount, such as from about 50 ppm to about 250,000 ppm. Other amounts include, but are not limited to, from about 100 ppm or more, from about 200 ppm or more, from about 500 ppm or more, from about 1,000 ppm or more, from about 1,000 to about 4,000 ppm, from about 1,000 ppm to about 5,000 ppm, from about 1,000 ppm to about 7,500 ppm, from about 100 ppm to about 5,000 ppm, from about 1,000 ppm to about 10,000 ppm, from about 1,000 ppm to about 20,000 ppm, and the like. All of these ppm ranges are with respect to the nitrogen present in the powder.

According to one embodiment of the present invention, the tantalum powder produced is used to form a capacitor anode (e.g., wet anode or solid anode). The capacitor anode and capacitor (wet electrolytic capacitor, solid state capacitor, etc.) can be formed by any method and/or have one or more of the components/designs, for example, as described in U.S. Pat. Nos. 6,870,727; 6,813,140; 6,699,757; 7,190,571; 7,172,985; 6,804,109; 6,788,523; 6,527,937 B2; 6,462,934 B2; 6,420,043 B1; 6,375,704 B1; 6,338,816 B1; 6,322,912 B1; 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference. The powder can be formed into a green body and sintered to form a sintered compact body, and the sintered compact body can be anodized using conventional techniques. It is believed that capacitor anodes made from the tantalum powder produced according to the present invention have improved electrical leakage characteristics. The capacitors of the present invention can be used in a variety of end uses such as automotive electronics; cellular phones; computers, such as monitors, mother boards, and the like; consumer electronics including TVs and CRTs; printers/copiers; power supplies; modems; computer notebooks; and disk drives.

The present invention will be further clarified by the following examples, which are intended to be exemplary of the present invention.

EXAMPLES

Example 1

In the present embodiment, a manufacturing device shown in FIG. 1 was used, wherein the container 11 is a 50 L container in which all the areas having come in contact with liquid and gas are made of high-purity tantalum. In the container 11, 35 kg of potassium chloride was added and heated at 800° C. until dissolved while stirring by the stirring means 12. Next, after dissolving 37.5 g of potassium tantalum fluoride in the dissolved potassium chloride, while dispersedly adding 10.8 g of molten sodium by the first adding means 13, nitrogen was dispersedly added by the second adding means 14. As a result, fine tantalum particles were obtained by reducing the potassium tantalum fluoride. After having thermally aggregated the fine tantalum particles at 1100° C., and crushing them with a roll granulator, tantalum powder of 44 to 150 μm was obtained. Furthermore, for all the raw materials that were used in the present manufacturing example, the moisture therein had been removed prior to being used.

Example 2

Fine tantalum powder was obtained after repeating the same potassium tantalum fluoride reduction three times as in Example 1. Next, while maintaining the dissolution of potassium chloride, 100 g of potassium tantalum fluoride was newly added into the container 11. Next, DC alternating current with inversion frequency of 100 Hz under the current density of 0.02 A/cm$^2$ was generated by the DC alternating current power supply 16, through the container 11 and the electrode 15 of the DC alternating current was applied on the fine tantalum particles for 15 seconds, and the fine tantalum particles were subjected to electrolytic and electrodeposition treatment for electrolytic polishing. At this time, the inside of the container 11 was stirred by the stirring means 12 to such that particles obtained would precipitate. Furthermore, the time for electrodeposition (time while fine tantalum particles are acting as a cathode) is set to be 1.5 times as much as that for electrolysis (time while fine tantalum particles are acting as an anode). As described, smooth surface fine tantalum particles (tantalum powder) were obtained.

Example 3

In the same way as Example 2, with the exception that the amount of potassium tantalum fluoride to be newly added into the container 11 was 50 g, the current density of DC alternating current was 0.02 A/cm$^2$, and the duration for applying DC alternating current was 10 seconds, smooth surface fine tantalum particles (tantalum powder) were obtained.

Example 4

In the same way as Example 2, with the exception that potassium tantalum fluoride was added only once after repeating potassium tantalum fluoride reduction three times, smooth surface fine tantalum particles (tantalum powder) were obtained.

Example 5

Tantalum chloride, vaporized at 300° C. was reduced by hydrogen and fine tantalum particles having an average primary grain size of approximately 30 nm were obtained. Electrolytic polishing was carried out at 1 kHz for the fine tantalum particles by subjecting them to the same electrolytic electrodeposition treatment as in Example 2, and smooth surface fine tantalum particles (tantalum powder) were obtained.

Example 6

In the same way as Example 5, with the exception that tantalum chloride was reduced by sodium that had been vaporized at 900° C. instead of hydrogen, smooth surface fine tantalum particles (tantalum powder) were obtained.

With regard to the tantalum powder obtained in Examples 1 through 6, the CV values and leakage current were measured as below. The results are shown in Table 1.

Measuring Method of CV Value: Pellets were produced by forming tantalum powder such that the density was 4.5 g/cm$^3$, then the pellets were chemically converted in a phosphoric acid aqueous solution of concentration 0.1 vol. % at a voltage of 6V and a current of 90 mA/g. The chemically converted pellets were then used as measuring samples to measure the CV value in a sulfuric acid aqueous solution of concentration 30.5 vol. % at a temperature of 25° C. under a frequency of 120 Hz and a voltage of 1.5V.

Measuring Method of Leakage Current: Pellets were produced by forming tantalum powder such that the density was 4.5 g/cm$^3$, then the pellets were chemically converted in a phosphoric acid aqueous solution of concentration 0.1 vol. % at a voltage of 6V and a current of 90 mA/g. The chemically converted pellets were then used as measuring samples to measure the leakage current in a phosphoric acid aqueous solution of concentration 10 vol. % at a temperature of 25° C. by applying a voltage of 4.0V for three minutes.

TABLE 1

| Manufacturing Example | Average grain size of primary particles (nm) | CV value (μFV/g) | Leakage current (nA/μF) |
| --- | --- | --- | --- |
| 1 | 25 | 455000 | 5.0 |
| 2 | 23 | 500800 | 4.0 |
| 3 | 17 | 609000 | 4.5 |
| 4 | 14 | 708000 | 10.0 |
| 5 | 13 | 790000 | 9.5 |
| 6 | 28 | 650300 | 9.0 |

In Example 1, wherein potassium tantalum fluoride was only reduced in the molten salt by sodium, the CV value of the tantalum powder was approximately 455,000 μFV/g. However, in Examples 2 through 4, wherein electrolytic and electrodeposition treatment was applied, the average grain size of the primary particles was within a range of 10 to 30 μm, the CV value of the tantalum powder increased to approximately 500,000 to 700,000 μFV/g, and the leakage current remained below 10 nA/μF.

In Example 5, wherein tantalum chloride was reduced by hydrogen and electrolytic and electrodeposition treatment was applied, the average grain size of the primary particles was within a range of 10 to 30 μm, the CV value of the tantalum powder increased to approximately 800,000 μFV/g, and the leakage current remained below 10 nA/μF.

In Example 6, wherein tantalum chloride was reduced by sodium and electrolytic and electrodeposition treatment was applied, the average grain size of the primary particles fell within a range of 10 to 30 μm, the CV value of the tantalum powder increased to approx. 650,000 μFV/g, and the leakage current remained below 10 nA/μF.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A tantalum powder, wherein when said tantalum powder is formed into an electrolytic capacitor anode, said anode has a capacitance of from 450,000 to 800,000 μFV/g, and is measured by pressing tantalum powder into pellets with tantalum lead wires, with a press density of 4.5 g/cm$^3$, sintering said pellets, anodizing said sintered pellets in a phosphoric acid aqueous solution having a concentration of 0.1 vol. % under a voltage of 6V and a current of 90 mA/g to form anodized pellets and testing capacitance in a sulfuric acid aqueous solution having a concentration of 30.5 vol. % at a temperature of 25° C. under a frequency of 120 Hz and a voltage of 1.5V.

2. A method of making the tantalum powder of claim 1, comprising:
   forming fine tantalum particles by dispersedly adding at least one reducing agent into potassium tantalum fluoride dissolved in molten salt, and
   reducing surface roughness and/or increasing neck thickness of the fine tantalum particles by subjecting said fine tantalum particles to an electrolytic and electrodeposition treatment.

3. The method of claim 2, further comprising thermally aggregating or agglomerating the fine tantalum particles after said electrolytic and electrodeposition treatment to form agglomerated particles and then crushing and sieving said agglomerated particles.

4. The method of claim 2, wherein said method occurs in a container with an internal temperature of 770° C. to 880° C.

5. The method of claim 2, wherein said electrolytic and electrodeposition treatment occurs with a current density of from 0.001 to 0.1 A/cm$^2$.

6. The method of claim 2, wherein a reaction occurs between said reducing agent and potassium tantalum fluoride with a reaction speed that does not exceed 1 nm/sec.

7. The method of claim 2, wherein said electrodeposition treatment occurs 0.8 to 10 times as much as said electrolytic treatment.

8. The method of claim 2, wherein said electrolytic and electrodeposition treatment has an inversion frequency within 0.226 nm/sec.

9. A method of making the tantalum powder of claim 1, comprising:
   forming fine tantalum particles by contacting at least one gaseous reducing agent with at least one gaseous tantalum compound, and
   reducing surface roughness and/or increasing neck thickness of the fine tantalum particles by subjecting said fine tantalum particles to an electrolytic and electrodeposition treatment.

10. The tantalum powder of claim 1, wherein said tantalum powder has an average primary particle size of from 10 nm to 30 nm.

11. The tantalum powder of claim 1, wherein said tantalum powder has a particle size distribution wherein 80% or more of the tantalum powder falls within +/−5 nm of the average particle size.

12. The tantalum powder of claim 1, wherein said tantalum powder has a flow rate of 30 seconds to 3 minutes.

13. The tantalum powder of claim 1, wherein said tantalum powder has a D50 secondary particle size of from 1 micron to 150 microns.

14. The tantalum powder of claim 13, wherein said tantalum powder has a D10 secondary particle size of from 0.7 micron to 20 microns and a D90 secondary particle size of from 5 microns to 200 microns.

15. The tantalum powder of claim 1, wherein said tantalum powder has a BET surface area of from 4 to 20 m$^2$/g;
   an agglomerated tertiary tantalum powder average grain size of 44 microns to 150 microns;
   a tantalum metal purity of 99% Ta or higher; and
   a Fisher sub-sieve of from 0.10 micron to 2.5 microns.

16. The tantalum powder of claim 15, wherein said tantalum powder has a pore size distribution that is unimodal.

17. The tantalum powder of claim 15, wherein said tantalum powder has a pore diameter with a center peak intensity of from 0.1 micron to 0.2 micron and a peak height of from 0.3 to 0.5 dV/d (logd).

18. The tantalum powder of claim 1, wherein said tantalum powder has an average particle size of from 13 to 27 nm;
   a particle size distribution wherein 90% to 99% of the tantalum powder falls within ±5 nm of the average grain size;
   a flow rate of 30 seconds to 3 minutes;
   a D50 secondary particle size of from 75 microns to 150 microns;
   a D10 secondary particle size of from 5 microns to 10 microns;
   a D90 secondary particle size of from 20 microns to 125 microns;
   a BET of from 4 to 20 m$^2$/g;
   an agglomerated secondary average particle size of from 500 microns to 5,000 microns;
   a Fisher sub-sieve of from 0.10 micron to 2.5 microns;
   a pore diameter with a center peak intensity of from 0.1 micron to 0.2 micron; and
   a pore diameter with a peak height of from 0.3 to 0.5 dV/d (logd).

19. The tantalum powder of claim 18, wherein said tantalum powder has a particle size distribution (based on overall %) as follows, based on U.S. standard mesh size:
   60# of from about 0.0 to about 1%;
   60/170 of from about 45% to about 70%;
   170/325 of from about 20% to about 50%;
   325/400 of from about 1.0% to about 10%; and
   −400 of from about 0.1 to about 2.0%.

20. The tantalum powder of claim 18, wherein said tantalum powder has a particle size distribution (based on overall %) as follows, based on U.S. standard mesh size:
   +60# of from about 0.0 to about 0.5%;
   60/170 of from about 55% to about 65%;
   170/325 of from about 25% to about 40%;
   325/400 of from about 2.5% to about 7.5%; and
   −400 of from about 0.5% to about 1.5%.

21. The tantalum powder of claim 18, wherein said tantalum powder has a particle size distribution (based on overall %) as follows, based on U.S. standard mesh size:
   +60# of 0 or about 0.0;
   60/170 of from about 60% to about 65%;
   170/325 of from about 30% to about 35%;
   325/400 of from about 4 to about 6%; and
   −400 of from about 0.5% to about 1.5%.

22. The tantalum powder of claim 1, wherein said tantalum powder has:
   an oxygen content of from about 5,000 ppm to about 60,000 ppm;
   an oxygen (in ppm) to BET (in m$^2$/g) ratio of from about 2,000 to about 4,000;
   a carbon content of from about 1 ppm to about 100 ppm;
   a nitrogen content of from about 100 ppm to about 20,000 ppm;

a hydrogen content of from about 10 ppm to about 1,000 ppm;
an iron content of from about 1 ppm to about 50 ppm;
a nickel content of from about 1 ppm to about 150 ppm;
a chromium content of from about 1 ppm to about 100 ppm;
a sodium content of from about 0.1 ppm to about 50 ppm;
a potassium content of from about 0.1 ppm to about 100 ppm;
a magnesium content of from about 1 ppm to about 50 ppm;
a phosphorus (P) content of from about 5 ppm to about 500 ppm; and
a fluoride (F) content of from about 1 ppm to about 500 ppm.

23. The tantalum powder of claim 1, wherein said tantalum powder has:
an oxygen content of from about 12,000 ppm to about 20,000 ppm;
an oxygen (in ppm) to BET (in m$^2$/g) ratio of from about 2,800 to about 3,200;
a carbon content of from about 10 ppm to about 50 ppm;
a nitrogen content in the form of a solid solution of from about 1,000 ppm to about 5,000 ppm;
a hydrogen content of from about 400 ppm to about 600 ppm;
an iron content of from about 5 ppm to about 20 ppm;
a nickel content of from about 25 ppm to about 75 ppm;
a chromium content of from about 5 ppm to about 20 ppm;
a sodium content of from about 0.5 ppm to about 5 ppm;
a potassium content of from about 30 ppm to about 50 ppm;
a magnesium content of from about 5 ppm to about 25 ppm;
a phosphorus (P) content of from 100 ppm to about 300 ppm; and
a fluoride (F) content of from about from about 100 ppm to about 300 ppm.

24. The tantalum powder of claim 1, wherein said anode has a DC leakage of below 10 nA/μF.

25. An electrolytic capacitor anode comprising the tantalum powder of claim 1, and having said capacitance.

26. The electrolytic capacitor of claim 25, wherein said anode has a DC leakage of below 10 nA/μF.

27. The electrolytic capacitor anode of claim 25, wherein said capacitance is 550,000 CV/g to 800,000 CV/g.

* * * * *

UNITED STATES PATENT AND TRADEMARK OFFICE
CERTIFICATE OF CORRECTION

PATENT NO. : 7,679,885 B2
APPLICATION NO. : 12/261149
DATED : March 16, 2010
INVENTOR(S) : Mizusaki et al.

It is certified that error appears in the above-identified patent and that said Letters Patent is hereby corrected as shown below:

Column 16, line 38, "60# of from" should read --+60# of from--

Signed and Sealed this

Twenty-seventh Day of April, 2010

David J. Kappos
*Director of the United States Patent and Trademark Office*